US010484107B2

(12) United States Patent
Feigin

(10) Patent No.: US 10,484,107 B2
(45) Date of Patent: Nov. 19, 2019

(54) CALIBRATION NETWORK FOR A PHASED ARRAY ANTENNA

(71) Applicant: Elta Systems Ltd., Ashdod (IL)

(72) Inventor: Yuri Feigin, Ashdod (IL)

(73) Assignee: ELTA SYSTEMS LTD., Ashdod (IL)

(*) Notice: Subject to any disclaimer, the term of this patent is extended or adjusted under 35 U.S.C. 154(b) by 784 days.

(21) Appl. No.: 15/159,366

(22) Filed: May 19, 2016

(65) Prior Publication Data

US 2016/0380711 A1 Dec. 29, 2016

(30) Foreign Application Priority Data

Jun. 23, 2015 (IL) ........................................ 239596

(51) Int. Cl.
| | |
|---|---|
| *H04B 17/12* | (2015.01) |
| *H01Q 3/26* | (2006.01) |
| *H04B 17/21* | (2015.01) |
| *H01Q 3/30* | (2006.01) |
| *H04B 1/40* | (2015.01) |
| *H04B 7/06* | (2006.01) |

(52) U.S. Cl.
CPC ............ *H04B 17/12* (2015.01); *H01Q 3/267* (2013.01); *H01Q 3/30* (2013.01); *H04B 1/40* (2013.01); *H04B 17/21* (2015.01); *H04B 7/0617* (2013.01)

(58) Field of Classification Search
None
See application file for complete search history.

(56) References Cited

U.S. PATENT DOCUMENTS

| | | | |
|---|---|---|---|
| 5,248,982 A | 9/1993 | Reinhardt et al. | |
| 7,362,266 B2 | 4/2008 | Collinson | |
| 7,714,776 B2 | 5/2010 | Cooper et al. | |
| 8,754,811 B1* | 6/2014 | Uscinowicz | H01Q 3/267 342/375 |

(Continued)

FOREIGN PATENT DOCUMENTS

| | | |
|---|---|---|
| WO | 96/30963 | 10/1996 |
| WO | 98/26472 | 6/1998 |
| WO | 2015/065912 | 5/2015 |

OTHER PUBLICATIONS

Extended European Search Report from European Application No. 16170791.4, dated Oct. 27, 2016.

*Primary Examiner* — Whitney Moore
(74) *Attorney, Agent, or Firm* — Dorsey & Whitney LLP

(57) ABSTRACT

A calibration network system for an array antenna and method for calibrating of the array antenna are described. The system includes a pair of rectangular waveguides stacked in parallel relation to each other and spaced apart at a distance of a quarter of an operating wavelength. The rectangular waveguides includes through-holes extending through a side-wall of the stacked rectangular waveguides from a bottom of a lower waveguide to a top of an upper waveguide to accommodate coaxial transmission lines. The side-wall has openings between the through-holes and an interior region of the rectangular waveguides in order to provide coupling of the coaxial transmission lines into the pair of rectangular waveguides. The system includes 90 degree phase shifter coupled to the upper rectangular waveguide, and a power divider/combiner coupled to a reference T/R Module, to the 90 degree phase shifter and to the lower rectangular waveguide.

17 Claims, 4 Drawing Sheets

(56) References Cited

U.S. PATENT DOCUMENTS

2005/0017904 A1* 1/2005 Navarro ............... H01Q 21/065
 343/700 MS
2013/0285864 A1* 10/2013 Clymer ................. H01Q 1/185
 343/753
2015/0311930 A1* 10/2015 Clark .................... H01Q 3/267
 455/296

* cited by examiner

CALIBRATION NETWORK FOR A PHASED ARRAY ANTENNA

CROSS-REFERENCE TO RELATED APPLICATIONS

This application claims priority to Israel Patent Application No. 239596 filed on 23 Jun. 2015, the disclosure of which is incorporated herein, in its entirety, by this reference.

TECHNICAL FIELD

Embodiments of the invention relate to phased array antennas and, in particular, to calibration of phased array antennas.

BACKGROUND

A phased array antenna includes an array of antenna elements adapted to produce a plurality of collimated and differently directed beams of radio frequency (RF) energy. Beams are formed by weighing the amplitude and shifting the phase of the signal emitted from each radiating element, to provide constructive/destructive interference so as to steer the beams in the desired direction.

Each element in the phased array, or a group of elements, is driven by a transmit/receive (T/R) module which includes a controllable attenuator (or amplifier) and a controllable phase-shifter adapted for controlling the amplification and phase shift of the T/R modules.

In order to obtain the desired directional properties of an antenna, it is necessary to minimize the side lobe levels of the antenna. To enable low side lobe levels with an electrically controlled phased array antenna, high accuracy of amplification and phase shift in the modules is required. In practice, this is achieved by calibration function of the phased array. The calibration concept is based on the compensation of amplitude and phase errors owing to the various contributions of cables, attenuators, phase shifters, regulators and other passive and active parts in the transmit/receive channels, which respond differently at different temperatures, for each antenna element and at each radio frequency. The calibration procedure is required to determine what controls should be applied to the T/R modules in order to obtain the desired current distribution on the antenna aperture.

For example, if it is required that the phase of the signal fed to all antenna elements be identical, but it is found during calibration that, owing to mismatches in the phase shifters coupled to the first and second antenna elements, there is a certain phase difference $\Delta\varphi$ between the signals output by a first antenna element and a second antenna element, then the phase shift signal that is fed to the second antenna element must have a phase offset of $-\Delta\varphi$ relative to the phase shift signal fed to the first antenna in order to compensate for the mismatch in the two phase shifters. Differences between the amplitudes of signals that are output by different antenna elements caused by mismatches in the gains of the amplifiers coupled to the antenna elements are compensated for in a similar manner by applying different gain offsets to the antenna elements relative to a given reference antenna element.

A phased array antenna must be calibrated during manufacture in the factory before being deployed in the field in order to ensure that the radiation pattern of the antenna meets antenna performance specifications. Calibration is performed in the far field or on the near-field antenna ranges.

During receiver calibration mode, for example, a sampling probe of RF energy is positioned in the near-field of the phased array antenna elements. The T/R modules are sequentially activated. The amplitude and phase of each radiating element is accurately measured through each T/R module amplitude and phase state. These data are used to develop correction coefficients that minimize the element-to-element random errors. The desired radiation pattern is then achieved by adjusting the T/R module amplitudes and phases as indicated by the correction factors.

During use, performance of the antennas may deteriorate over time since one or more antenna elements may get out of calibration. In addition, failed T/R modules must be replaced. Replacement of a failed T/R module during antenna maintenance is usually a routine procedure, however, since the replaced T/R modules inevitably have slightly different properties to the original antenna elements, the original offsets will not compensate for slight differences in the phase and gain characteristics of the phase shifters and amplifiers used to feed steering signals to the corresponding antenna elements. As a result, the T/R modules must be re-calibrated to correct the drift of the component characteristics or the module replacement.

The complete phase antenna array can, for example, be returned to the manufacturer for re-calibration in order to establish the new offsets. It is also known to perform the re-calibration procedure in the field. For this purpose, the phased array antenna usually includes a calibration network for which the required offsets are known for each phase shifter and amplifier. The purpose of the calibration network is to provide injection of a predetermined calibration signal to each antenna element and to the corresponding T/R module connected to the antenna element.

During the re-calibration procedure, a calibration signal is injected into the calibration network. The amplifications and phase shifts of the T/R modules are obtained by considering the change in amplitudes and phases of the calibration signal when it passes the replaced T/R module. The control signals controlling the attenuators and the phase shifters in the T/R modules can then be corrected so that the amplification and the phase-shift are made to coincide with the desired amplification and phase-shift.

Several calibration network systems are known which can be used to calibrate a phased array antenna. Thus a technique is known whereby a transmission line, such as a micro-strip line, is placed close to the antenna elements, thus creating a non-directional coupling between the antenna elements and the corresponding portions of the transmission line. The term "non directional coupling" refers herein to a case where the amount of energy transferred from a calibration network toward an RF front is approximately equal to the amount of radiating energy transferred from the calibration network toward the antenna elements for radiation. It should be noted that a calibration network of this type is highly sensitive to the presence of external objects, due to reflection of the radiated energy by these objects.

A calibration network is also known that includes a set of RF directional couplers (one coupler per antenna element) placed physically close to each of the antennas. The RF directional couplers are interconnected and driven by a passive network having a corporate feed point. The passive network splits the drive calibration signal in a predetermined manner so that the signal fed to each antenna element is known in advance and the phase and gain offsets are known and predetermined.

In use of such a calibration network, precise adjustment is required to ensure that the signals fed via the couplers to the antenna element are identical in amplitude and phase. Therefore, if parameters of the components of the calibration network change for any reason, e.g. owing to changes in ambient temperature that may induce changes to the lengths of connectors, such changes must be compensated for.

This requires complex and costly circuitry associated with the calibration network in order to combine the signals passing from the antenna elements to a single corporate feed connector.

GENERAL DESCRIPTION

Thus, there is still a need in the art for, and it would be useful to have, a novel calibration network system and method of calibrating an array antenna that would provide a relatively simple and compact implementation.

One or more embodiments of the present invention partially eliminates disadvantages of conventional calibration networks and provides a new implementation scheme which enables to connect a plurality of the antenna elements arranged in columns and/or rows to a single calibration line. Such implementation can greatly reduce the complexity of an array antenna having such an integral calibration signal injection network.

According to one general aspect of the present invention, there is provided a calibration network system for an array antenna having a plurality of antenna elements and a plurality of T/R modules coupled to the antenna elements through a plurality of the corresponding coaxial transmission lines, such as coaxial cables or connectors.

According to an embodiment of the present invention, the calibration network system includes a waveguide arrangement including one or more pairs of rectangular waveguides. The rectangular waveguides have an inside height of side-walls smaller than an inside width of top and bottom walls. The rectangular waveguides are vertically stacked in parallel relation to each other to form lower and upper rectangular waveguides. The terms "vertically stacked", "lower rectangular waveguide", and "upper rectangular waveguide" are used herein for the purpose of description of a relationship between the rectangular waveguides of the waveguide arrangement, rather than for description of orientation of the waveguides arrangement in space.

According to an embodiment of the present invention, the lower and upper rectangular waveguides are spaced apart at a distance of about a quarter of a desired operating wavelength of the array antenna between the centers of the rectangular waveguides.

According to an embodiment of the present invention, each waveguide in the pair of rectangular waveguides can be a rectangular ridge waveguide.

According to an embodiment of the present invention, at least one waveguide in the pair of rectangular waveguides is filled with a dielectric material.

According to an embodiment of the present invention, the pair of rectangular waveguides includes a plurality of circular through-holes extending through at least one side-wall of the vertically stacked rectangular waveguides from a bottom of the lower rectangular waveguide to a top of the upper rectangular waveguide. The circular through-holes have a diameter sufficient to accommodate coaxial transmission lines passing through the through-holes.

According to an embodiment of the present invention, the side-walls of the lower and upper rectangular waveguides have openings between the circular through-holes and the interior region of the lower and upper rectangular waveguides. These openings provide coupling of the electromagnetic energy carried by the coaxial transmission lines into the rectangular waveguides and backwards.

According to an embodiment of the present invention, the openings in said at least one side-wall are slots along at least a part of the height of the side-walls.

Each coaxial transmission line includes a wire core, an inner dielectric insulator surrounding the wire core, and an outer conductor shield surrounding the inner dielectric insulator.

The outer conductor can, for example, include a woven wire. According to an embodiment of the present invention, the outer conductor shield for each coaxial line is connected to the bottom wall of the lower rectangular waveguide and to the top wall of the upper rectangular waveguide, whereas the outer conductor shield is stripped away from the coaxial line from a portion of the coaxial line that is located against the corresponding opening arranged in the side-walls.

According to an embodiment of the present invention, the calibration network system also includes a RF power divider/combiner having an input port configured for coupling to a reference Transmit/Receive (T/R) Module and two output ports which are connected correspondingly to the upper and lower rectangular waveguides at ends located at one side of the pair of rectangular waveguides.

According to an embodiment of the present invention, the calibration network system also includes a phase shifter. The phase shifter has two phase shifter terminals and is connected at one phase shifter terminal to the upper rectangular waveguide. Alternatively, the phase shifter can be arranged in the upper rectangular waveguide of the pair of rectangular waveguides between the corresponding output port of the RF power divider/combiner and a coaxial cable being first on the way for a wave propagating from the RF power divider/combiner through the upper rectangular waveguide.

According to one embodiment of the present invention, the 90 degree phase shifter is configured to provide a minus 90 degree phase shift.

According to another embodiment of the present invention, the 90 degree phase shifter is configured to provide a plus 90 degree phase shift.

According to an embodiment of the present invention, the RF power divider/combiner and the 90 degree phase shifter are combined together in a 90 degree hybrid coupler.

According to an embodiment of the present invention, the calibration network system also includes a dummy load configured for termination of other ends of the upper and lower rectangular waveguides, which are not coupled to the RF power divider/combiner.

According to a further embodiment of the present invention, the calibration network further includes another RF power divider/combiner. Another RF power divider/combiner has two output ports connected to the upper and lower waveguides at other ends of the upper and lower rectangular waveguides, correspondingly. Moreover, the calibration network can further include another 90 degree phase shifter arranged in the upper waveguide between the corresponding output port of the other RF power divider/combiner and a coaxial cable being first on the way for a wave propagating through this waveguide from the other RF power divider/combiner.

According to an embodiment of the present invention, the other RF power divider/combiner and the other 90 degree phase shifter are combined together in another 90 degree hybrid coupler.

The calibration network system of the present invention has many of the advantages of the prior art techniques, while simultaneously overcoming some of the disadvantages normally associated therewith.

The calibration network system according to the present invention may be easily and efficiently manufactured.

The calibration network system according to the present invention is of durable and reliable construction.

The calibration network system according to the present invention may have a low manufacturing cost.

According to another general aspect of the present invention there is provided a method of calibrating an array antenna having a plurality of antenna elements coupled to a plurality of T/R modules of the array antenna through a plurality of the corresponding coaxial transmission lines.

According to an embodiment of the present invention, the method is implemented for adjusting operation the RF front end of the array antenna in a receiving mode of operation of the RF front end.

According to this embodiment, an internal calibration reference signal from the T/R reference module having a known amplitude and phase is injected to the RF power divider/combiner located at the end of the calibration network system. The RF power divider/combiner divides the internal calibration reference signal into two equal parts.

A first part of the divided internal calibration signal is coupled into the 90 degree phase shifter, whereas a second part of the divided internal calibration signal is coupled into the lower rectangular waveguide.

The first part of the divided internal calibration signal passes through the 90 degree phase shifter that provides a minus 90 degree phase shift to the first part of the internal calibration signal.

Then, the first part of the divided internal calibration signal shifted by minus 90 degrees is transferred through the upper rectangular waveguide and coupled into portions of the coaxial transmission lines passing through the upper rectangular waveguide. The coupling is carried out via the openings. The first part of the divided internal calibration signal shifted by minus 90 degrees is transferred from the upper rectangular waveguide towards the lower rectangular waveguide through portions of coaxial transmission lines that have a length of about a quarter of wavelength. As a result, the phase shift of the first part of the divided internal calibration signal is returned to 0 degrees.

In turn, the second part of the divided internal calibration signal is transferred from the RF power divider/combiner towards the coaxial transmission lines within the lower rectangular waveguide. This second part of the divided internal calibration signal is coupled to the portions of the coaxial transmission lines passing through the lower rectangular waveguide where the second part is combined in phase (owing to constructive interference) with the first part of the divided internal calibration signal. Then, a combined internal calibration signal including the first and second parts of the divided internal calibration signal received by each coaxial transmission line is relayed to the RF front end of the array antenna.

In turn, owing to destructive interference, radiating elements of the antenna are isolated and no energy is radiated, thereby eliminating influence of reflections from objects near to the antenna, on calibration accuracy.

Further, the combined internal calibration signal for each coaxial transmission line is compared with a corresponding predetermined reference data signal. This comparison is carried out for all coaxial transmission lines passing through the pair of the vertically stacked waveguides. When the combined internal calibration signal deviates from the corresponding predetermined reference data signal, one or more calibration parameters are calculated. After the calculation, the calibration parameters are applied to the RF front end of the array antenna for adjusting operation of the T/R modules.

According to another embodiment of the present invention, the method is implemented for adjusting operation of the T/R modules of the array antenna in a transmitting mode of operation of the T/R modules.

According to this embodiment, an internal calibration signal having a known amplitude and phase is injected sequentially from each T/R module into the corresponding coaxial transmission line.

The major part of the injected internal calibration signal is transferred from the T/R modules through the transmission lines towards the antenna radiating elements while a small part of this signal is coupled into the lower rectangular waveguide via the openings from the portions of the coaxial transmission lines passing through the lower rectangular waveguide. Then, this part of the internal calibration signal is transferred within the lower rectangular waveguide, and applied to one output port of the RF power divider/combiner.

In turn, the major part of the internal calibration signal is transferred through the portions of coaxial transmission lines from the lower rectangular waveguide towards the upper rectangular waveguide having a length of about a quarter of wavelength. Accordingly the portions of coaxial transmission lines provide a phase shift to the major part of the internal calibration signal of plus 90 degrees.

Then, another small part of the internal calibration signal, which has been transferred between the waveguides and therefore has a phase shift of plus 90 degrees, is coupled into the upper rectangular waveguide from the portions of the coaxial transmission lines passing through the upper rectangular waveguide.

This part of the internal calibration signal is transferred within the upper rectangular waveguide towards the 90 degree phase shifter configured to provide minus 90 degree phase shift. The 90 degree phase shifter is connected to the end of the upper rectangular waveguide at one phase shifter terminal and to the output port of the RF power divider/combiner at another phase shifter terminal. After passing through the 90 degree phase shifter, the phase shift of this part of the internal calibration signal is returned to 0 degrees. Then, this part of the internal calibration signal with the phase shift of 0 degrees is applied to the output port of the RF power divider/combiner connected to the 90 degree phase shifter.

The RF power divider/combiner combines in-phase these two small parts of the internal calibration signal, which have arrived from the lower and upper waveguides, and, owing to constructive interference, generates a combined internal calibration signal. This internal calibration signal has 0 degree phase shift.

The combined internal calibration signals originating from the T/R modules are relayed to the reference T/R module for comparing the combined internal calibration signal for each antenna element with a predetermined reference data signal. When the combined internal calibration signal deviates from the corresponding predetermined reference data signal, one or more calibration parameters are calculated. After the calculation, the calibration parameters are applied to the RF front end of the array antenna for adjusting operation of the T/R modules.

It should be noted that most of the signal energy is radiated by the antenna elements, and, as a result, reflections from external objects can occur and can be received at the antenna elements. The 90 degree relative phase shift provided by a quarter wavelength distance between the upper and lower waveguides prevents propagation of the received reflected signals towards the reference T/R module by creating destructive interference, thereby eliminating influence of reflections from the objects near the antenna on the calibration accuracy.

According to a further embodiment of the present invention, the method is implemented for indicating operation of the antenna elements of the array antenna. According to this embodiment, an external RF radiation having a known amplitude and phase provided from an external reference RF source is applied into each antenna element for calibration. External calibration signals generated by the antenna element are coupled to the corresponding coaxial transmission lines, forming a plurality of receive channels transferring the signals received by the antenna elements towards the TR modules of the RF front. For each channel, a small part of the external calibration signal is coupled into the upper rectangular waveguide through the portions of the coaxial transmission lines passing through the side-wall of the upper rectangular waveguide, whereas the major part of the external calibration signal is transferred towards the lower rectangular waveguide through portions of coaxial transmission lines that have a length of about a quarter of wavelength, thereby to provide a phase shift to the external calibration signal of plus 90 degrees.

The small part of the external calibration signal that was coupled to the upper rectangular waveguide is transferred through the 90 degree phase shifter connected to the upper rectangular waveguide at one phase shifter terminal and to the RF power divider/combiner at another phase shifter terminal. According to this embodiment, the 90 degree phase shifter provides a plus 90 degree phase shift to signals transferred therethrough.

Accordingly, the 90 degree phase shifter provides a plus 90 degree shift to the part of the external calibration signal that is applied to one output port of the RF power divider/combiner.

In turn, the major part of the external calibration signal is transferred from the upper rectangular waveguide towards the lower rectangular waveguide through the portions of coaxial transmission lines that have a length of about a quarter of wavelength. Accordingly, thereby, the major part of the external calibration signal obtains a phase shift of plus 90 degrees.

Another small part of the external calibration signal is coupled into the lower rectangular waveguide through the portions of the coaxial transmission lines passing through the side-wall of the lower rectangular waveguide. This small part of the external calibration signal is also shifted by plus 90 degrees.

After transferring within the lower rectangular waveguide, this shifted by plus 90 degrees small part of the external calibration signal is applied to another output port of the RF power divider/combiner. The RF power divider/combiner combines the two small parts of the external calibration signal to provide a combined external calibration signal having 90 degree phase shift.

The combined external calibration signal is relayed to the reference T/R module for comparing the combined external calibration signal for each antenna element with a predetermined reference data signal.

According to an embodiment of the present invention, an indicating signal can be generated when the combined external calibration signal deviates from the corresponding predetermined reference data signal. For this purpose the reference T/R module can include an indicating device, indicating which particular antenna elements are out of order.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
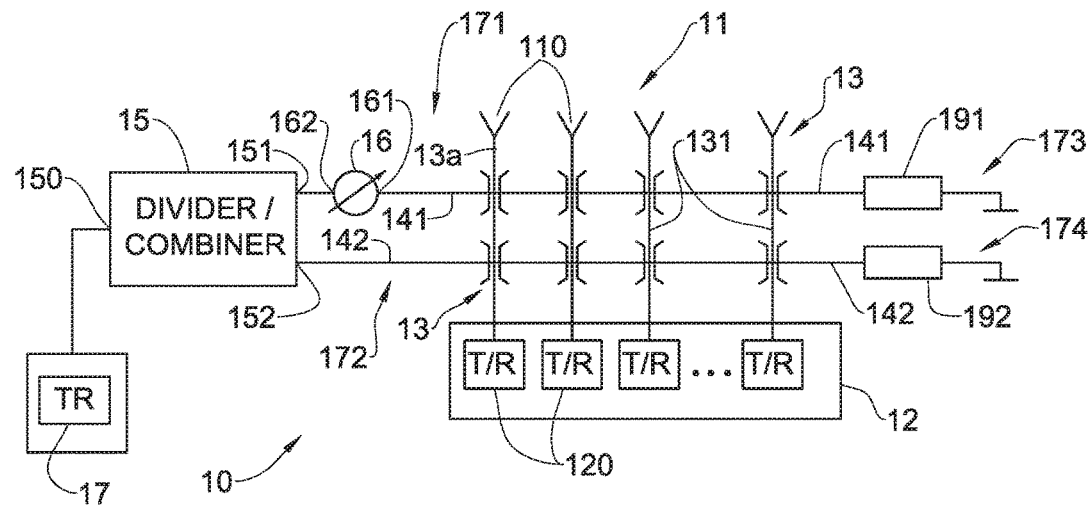
FIG. 1A illustrates a general electric scheme of a calibration network system, according to one embodiment of the present invention.

The principles of the method and system according to embodiments of the present invention may be better understood with reference to the drawings and the accompanying description, wherein like reference numerals have been used throughout to designate identical elements. It is to be understood that these drawings, which are not necessarily to scale, are given for illustrative purposes only and are not intended to limit the scope of the invention. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

It should be noted that the blocks as well other elements in these figures are intended as functional entities only, such that the functional relationships between the entities are shown, rather than any physical connections and/or physical relationships. Those versed in the art should appreciate that many of the examples provided have suitable alternatives which may be utilized.

Referring to FIG. 1A, a general electric scheme of a calibration network system 10 for an array antenna 11 having a plurality of antenna elements 110 and a radio frequency (RF) front end 12 is shown, according to one embodiment of the invention. Each antenna element 110 can radiate into space radio-frequency (RF) electro-magnetic energy (in short, RF energy) that is fed into the radiating element 110 from the RF front end 12, and may receive RF energy from space and feed this energy into the RF front end 12.

It should be noted that the subject of this invention is not limited to any particular implementation of the antenna elements 110. Hence, the radiating elements may be implemented in various alternatives. Examples of the radiating elements 110 include, but are not limited to, patch antenna elements; stacked patch antenna elements, microstrip antenna elements, dipole antenna elements, horn antenna elements, tapered-Slot Antenna (TSA) elements (also known as Vivaldi) and other antenna elements or a combination thereof. Consequently, the type, shape and configuration of the antenna elements 110 may be selected to be suitable for the technology adopted for the antenna.

The RF front end 12 includes a plurality of Transmit/Receive (T/R) modules 120 coupled to the antenna elements 110 through a plurality of the corresponding coaxial transmission lines 13, such as coaxial cables and/or connectors. The calibration network system 10 includes a waveguide arrangement 14 mounted between the antenna elements 110 and the RF front end 12, and connected to the coaxial transmission lines 13.

The waveguide arrangement 14 includes one or more pairs of upper and lower waveguides 141 and 142, although for simplicity of illustration, only one pair of waveguides is explicitly shown in FIG. 1A.

According to an embodiment of the present invention, the waveguides are spaced apart at a distance of about a quarter of the desired operating wavelength of the array antenna 11 and coupled to each other through portions 131 of the coaxial transmission lines 13 passing between the upper and lower waveguides 141 and 142. A distance between the waveguides 141 and 142 is calculated as the distance between their centers.

Because a length of the portions 131 is about a quarter of the desired operating wavelength, they provide a phase shift of about 90 degrees to signals transferred through these portions. In the present invention, the term "about" refers to a value, amount, or degree that is approximate or near the reference value. The term "about" means within a statistically meaningful range of a value and indicates a reasonable amount of deviation caused by the differences between the wavelength in different parts of the network and influences of the discontinuities in the waveguides and coaxial transmission lines that does not bring about a considerable change as a result. The extent of variation from the reference value encompassed by the term "about" is that which is typical for the tolerance levels or measurement conditions. The allowable variation encompassed by the term "about" depends on the particular system under consideration, and can be readily appreciated by one of ordinary skill in the art.

The calibration network system 10 further includes a radio frequency (RF) power divider/combiner 15. The RF power divider/combiner 15 has an input port 150 and two output ports 151 and 152. The input port 150 is connected to a reference Transmit/Receive (T/R) Module 17.

The calibration network system 10 further includes a 90 degree phase shifter 16 that has two phase shifter terminals 161 and 162. According to one embodiment of the present invention, the 90 degree phase shifter 16 is a dedicated device that can, for example, be connected at the phase shifter terminal 161 to an end 171 of the upper rectangular waveguide 141.

The output port 151 of the RF power divider/combiner 15 is connected to the 90 degree phase shifter 16 at the phase shifter terminal 162. The output port 152 of the RF power divider/combiner 15 is connected to an end 172 of the lower rectangular waveguide 142.

According to another embodiment, the 90 degree phase shifter 16 can be integrated with the waveguide 141 and arranged in the upper waveguide 141 between the end 171 of the upper rectangular waveguide and the coaxial transmission line 13a that is first on the way for a wave propagating from the end 171 through the waveguide 141. In this case, the two output ports 151 and 152 of the RF power divider/combiner 15 are connected to the waveguides 141 and 142 at their ends 171 and 172 located at one side of the waveguides 141 and 142, correspondingly.

As shown in FIG. 1A, other ends 173 and 174 which are located at another side of the waveguides 141 and 142 are terminated with dummy loads 191 and 192, correspondingly.

Figure 1B:
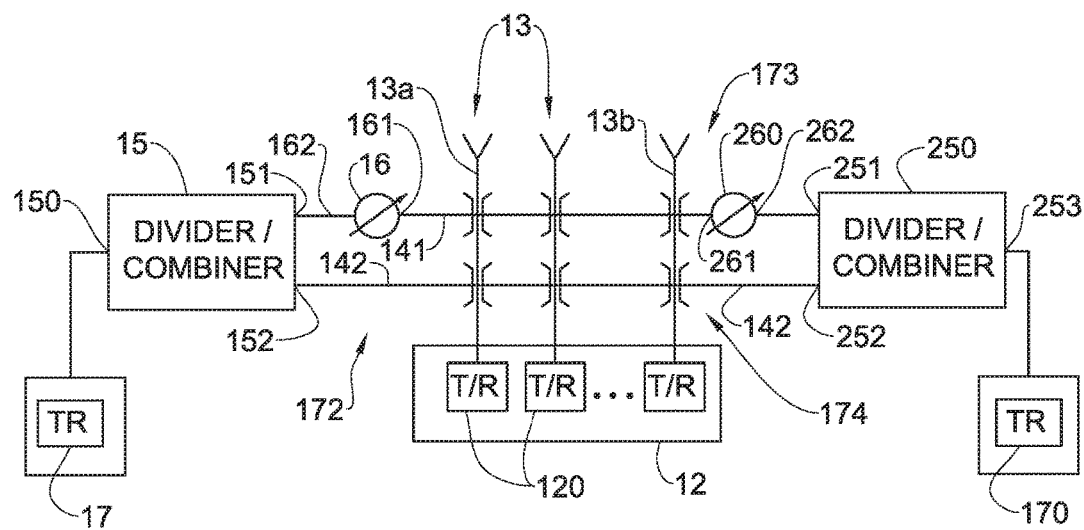
FIG. 1B illustrates a general electric scheme of a calibration network system, according to another embodiment of the present invention.

Referring to FIG. 1B, a general electric scheme of a calibration network system 100 for an array antenna 11 having a plurality of antenna elements 110 and a radio frequency (RF) front 12 is shown, according to another embodiment of the invention. The embodiment shown in FIG. 1B differs from the embodiment shown in FIG. 1A in that the calibration network system 100 further includes another 90 degree phase shifter 260, another RF power divider/combiner 250 and another reference T/R Module 170.

According to an embodiment of the present application, the 90 degree phase shifter 260 has two phase shifter terminals 261 and 262. The phase shifter terminal 261 is connected to an end 173 of the upper rectangular waveguide 141.

The calibration network system 10 further includes another radio frequency (RF) power divider/combiner 250 that has an input port 253 and two output ports 251 and 252. The input port 253 is connected to a reference Transmit/Receive (T/R) Module 170, whereas the two output ports 251 and 252 are connected correspondingly to the 90 degree phase shifter 260 at the phase shifter terminal 262, and to an end 174 of the lower rectangular waveguide 142.

According to another embodiment, the 90 degree phase shifter 260 can be integrated with the waveguide 141 and arranged in the upper waveguide 141 between the corresponding output port of the RF power divider/combiner 250 and coaxial cable 13b that is first on the other side. Thus, in this case, the coaxial cable 13b should be first on the way for a wave propagating through this waveguide 141 from the RF power divider/combiner 250.

Figure 2A:
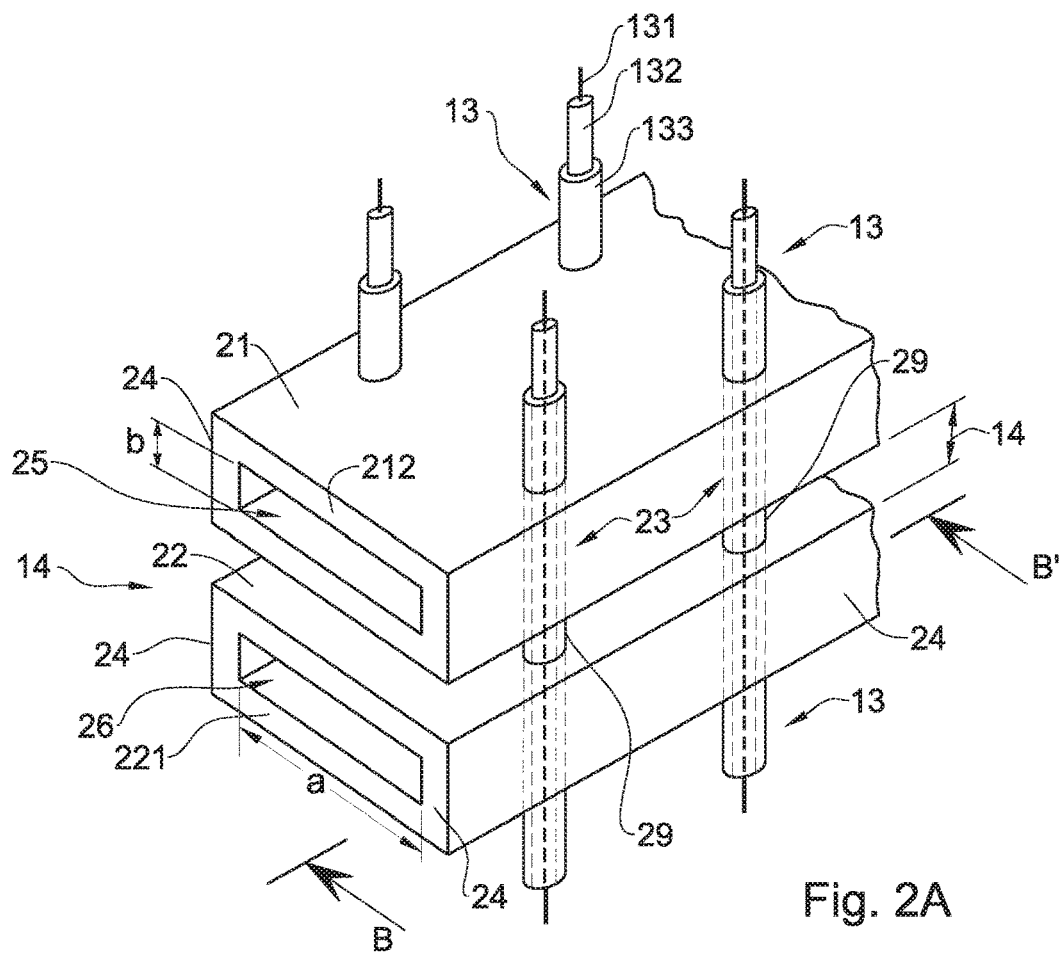
FIG. 2A illustrates a schematic perspective view of a portion of a waveguide arrangement of an array antenna, in accordance with an embodiment of the present invention.
Figure 2B:
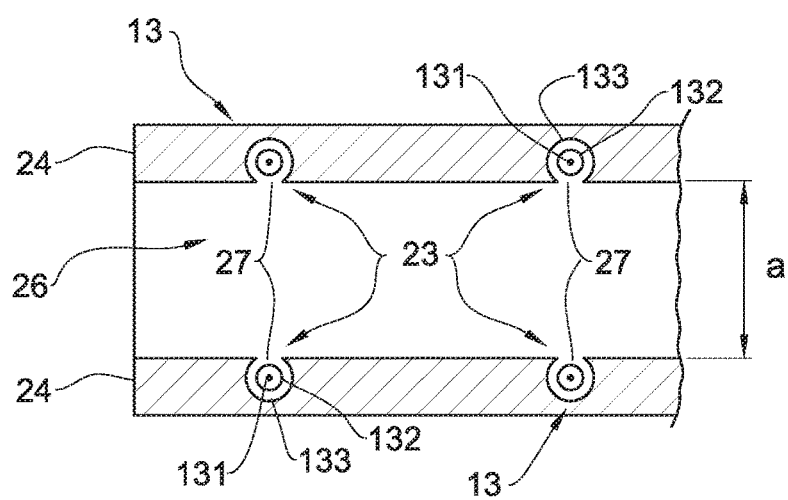
FIG. 2B illustrates a schematic top cross-sectional view of a portion of a waveguide arrangement of an array antenna shown in FIG. 2A taken along the line B-B'.

Referring to FIGS. 2A and 2B together, a schematic perspective view and a top cross-sectional view of a portion of the waveguide arrangement 14 of the array antenna (11 in FIGS. 1A and 1B) are shown, correspondingly, in accordance with an embodiment of the present invention. According to this embodiment, the waveguide arrangement 14 includes a pair of rectangular waveguides (141 and 142 in FIG. 1A), which are indicated in FIGS. 2A and 2B by reference numerals 21 and 22. The rectangular waveguides have an inside height b of side-walls smaller than an inside width a of top and bottom walls. The pair of rectangular waveguides is vertically stacked in parallel relation to each other to form a lower rectangular waveguide 22 and an upper rectangular waveguide 21. The terms "vertically stacked", "lower rectangular waveguide", and "upper rectangular waveguide" are used herein for the purpose of description of a relationship between the rectangular waveguides of the waveguide arrangement 14, rather than for description of orientation of the waveguide arrangement in space. Although one pair of vertically stacked rectangular waveguides is shown in FIG. 2A, generally, any desired number of the pairs can be employed, mutatis mutandis.

Figure 4:
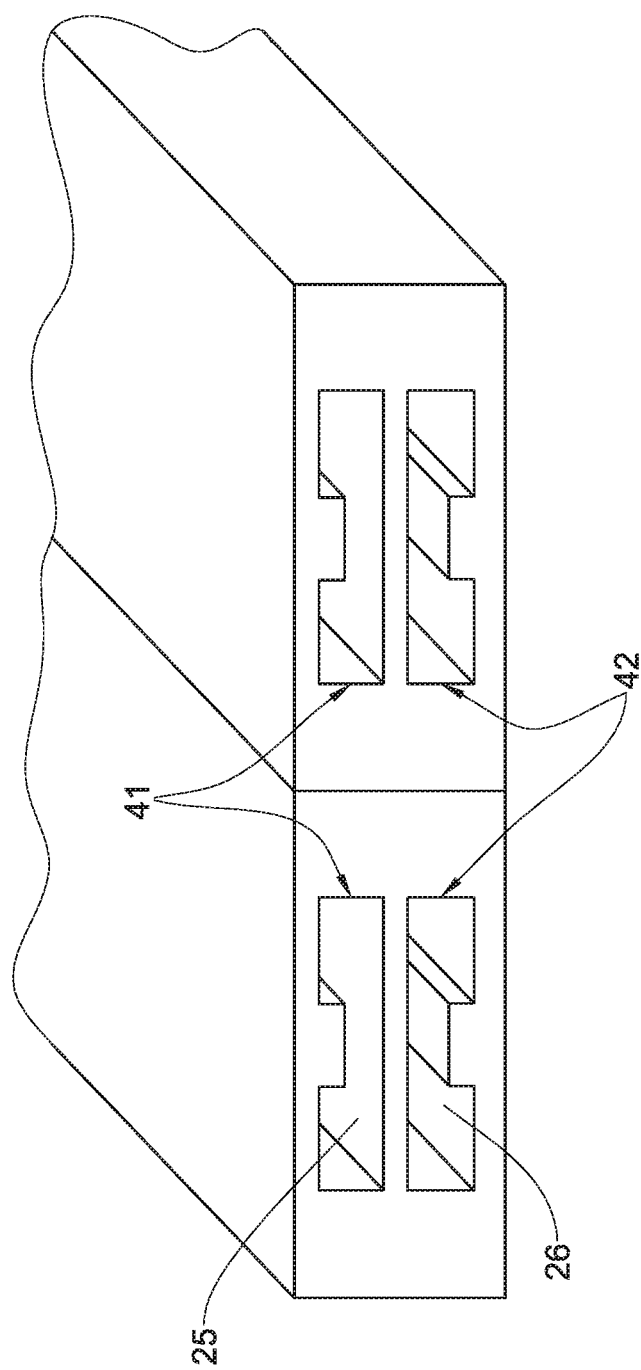
FIG. 4 illustrates a schematic perspective view of an example of two pairs of ridge rectangular waveguides suitable for the purpose of the system shown in FIG. 1.

Moreover, it should be noted that in order to provide a possibility of direct connection to the radiating elements of the phase array antenna, the width of the pair of rectangular waveguides should be adjusted in accordance with the inter-element spacing of the antenna. Thus, when the inter-element spacing is relatively small, interior regions 25 and 26 of the corresponding lower and upper waveguides 22 and 21 can be filled with a dielectric material. This provision allows reducing of the waveguide inner width. Furthermore, when a relatively small inter-element spacing is desired, the rectangular waveguides employed in the calibration network system (10 in FIGS. 1A and 1B) can be ridge rectangular waveguides. An example of two adjacent pairs of rectangular waveguides 41 and 42 suitable for the purpose of the present invention is shown in FIG. 4.

Turning back to FIGS. 2A and 2B, the lower rectangular waveguide 22 and the upper rectangular waveguide 21 are spaced apart at a distance of about a quarter of a desired operating wavelength of the array antenna (not shown). This distance is a length of a section 29 of the coaxial transmission line 13 coupling the lower rectangular waveguide 22 to the upper rectangular waveguide 21.

The rectangular waveguides 21 and 22 include a plurality of circular through-holes 23 extending through both side-walls 24 of the stacked rectangular waveguides from a bottom wall 221 of the lower rectangular waveguide 22 to a top wall 212 of the upper rectangular waveguide 21. Although four circular through-holes 23 arranged in two lines are shown in FIGS. 2A and 2B, generally, any desired number of the through-holes 23 can be arranged in the side-walls 24 of the stacked rectangular waveguides, mutatis mutandis.

The circular through-holes 23 have a diameter sufficient to accommodate coaxial transmission lines 13 passing through the circular through-holes 23. In order to provide coupling of the coaxial transmission lines 13 to the waveguides 21 and 22, the side-walls 24 of the stacked rectangular waveguides have openings 27 in FIG. 2B between the circular through-holes 23 and the interior regions 25 and 26 of the lower waveguide 22 and the upper rectangular waveguide 21, correspondingly. The openings 27 can have any desired shape and be formed as slots in the side-walls 24.

The coaxial transmission lines 13 include a wire core 131, an inner dielectric insulator 132 surrounding the wire core 131, and an outer conductor shield 133 surrounding the inner dielectric insulator 132. The coaxial transmission lines 13 can, for example, include a coaxial cable. In this case, the outer conductor shield 133 can, for example, be made from a woven wire.

The outer conductor shields 133 of the coaxial transmission lines 13 are connected to the bottom wall 221 of the lower rectangular waveguide 22 and to the top wall 212 of the upper rectangular waveguide 21. The outer conductor shields 133 of the coaxial transmission lines are stripped away from the coaxial transmission lines 13 from the portions of the coaxial transmission lines 13 which are located against the openings 27 arranged in the side-walls 24.

Figure 3A:
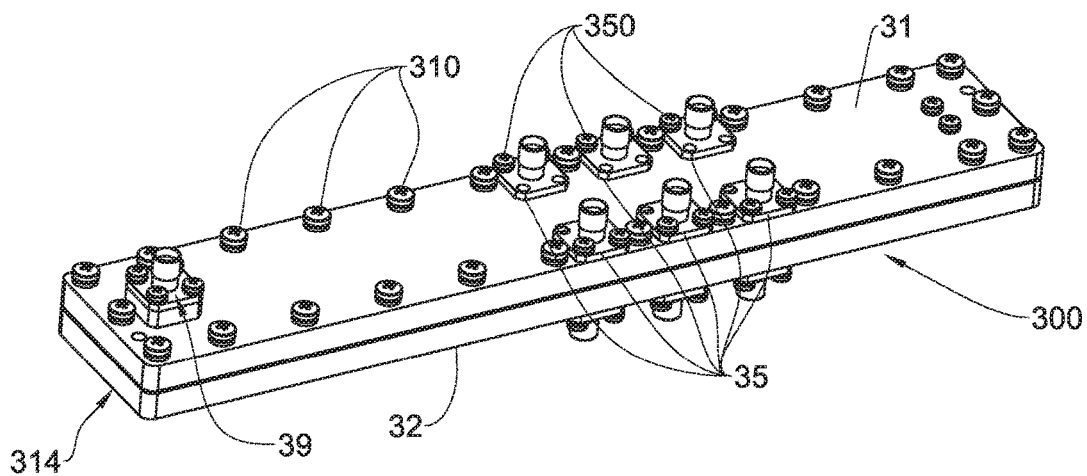
FIGS. 3A and 3B illustrate an assembled perspective view and an exploded perspective view of a calibration network system, according to an embodiment of the invention.
Figure 3B:
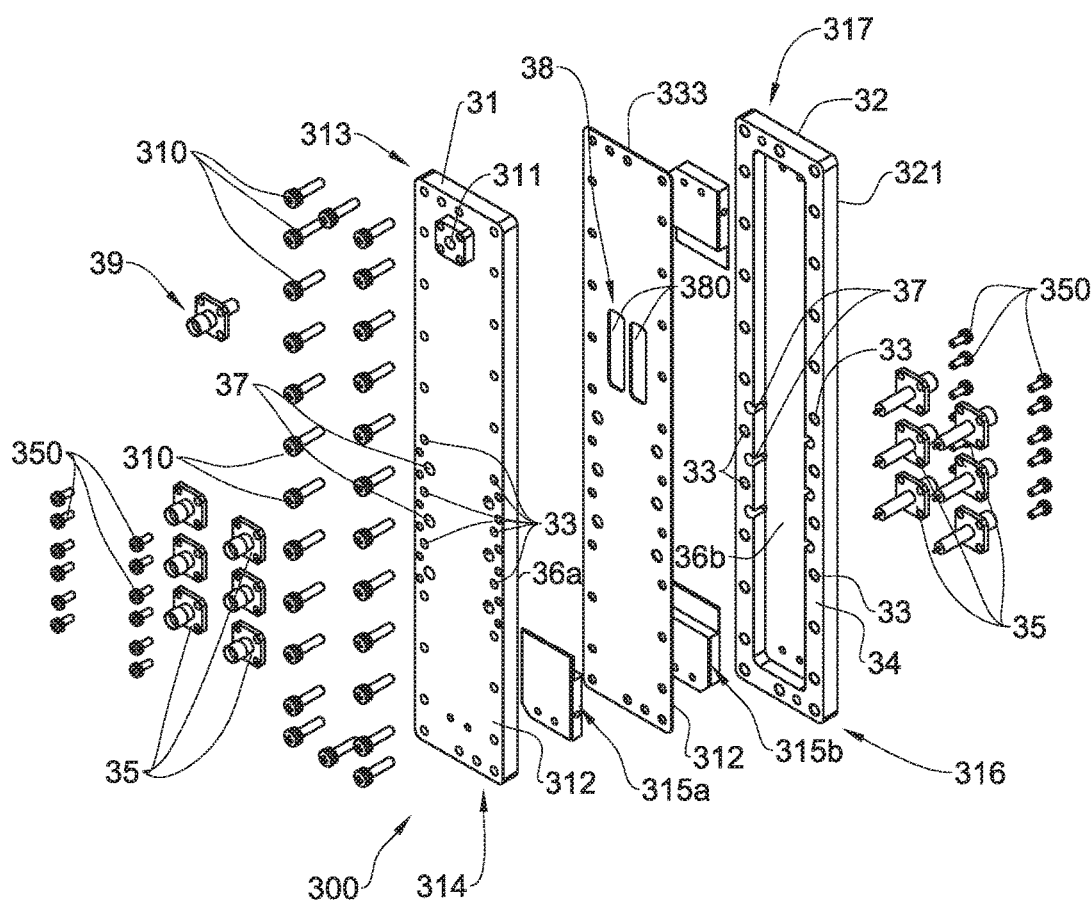

FIGS. 3A and 3B illustrate an assembled perspective view and an exploded view of a calibration network system 300 for an array antenna (11 in FIG. 1A), according to an embodiment of the invention. The calibration network system 300 includes a waveguide arrangement 314 having a pair of rectangular waveguides 31 and 32 vertically stacked in parallel relation to each other. The pair of rectangular waveguides includes an upper rectangular waveguide 31 having ends 313 and 314, and a lower rectangular waveguide 32 having ends 316 and 317. The lower rectangular waveguide 32 and upper rectangular waveguide 31 are spaced apart at a distance of about a quarter of a desired operating wavelength of the array antenna. As shown in FIGS. 3A and 3B, the lower rectangular waveguide 32 and an upper rectangular waveguide 31 are attached to each other by means of screws 310, however any other fastening tools, such as bolts, pins, etc., may also be used.

The calibration network system 300 further includes an electrically conductive plate 333 sandwiched between the lower rectangular waveguide 32 and an upper rectangular waveguide 31. Thus, the conductive plate 333 serves as a top wall of the lower rectangular waveguide 32 and as a bottom wall of the upper rectangular waveguide 31.

As shown in FIGS. 3A and 3B, the rectangular waveguides 31 and 32 may include a plurality of circular through-holes 33 extending through both side-walls 34 from a bottom wall 321 of the lower rectangular waveguide 32 to a top wall 312 of the upper rectangular waveguide 31. The circular through-holes 33 are equipped with coaxial connectors 35 configured for coupling the outer conductor shields of the coaxial transmission lines (not shown) to the bottom wall 321 of the lower rectangular waveguide 32 and to the top wall 312 of the upper rectangular waveguide 31. Although six circular through-holes 33 and the corresponding coaxial connectors 35 which are arranged in two lines are shown in FIGS. 3A and 3B, generally, any desired number of the through-holes 33 and the corresponding coaxial connectors 35 can be arranged, mutatis mutandis. The coaxial connectors 35 are attached to the rectangular waveguides 31 and 32 by means of screws 350, however any other fastening tools, such as bolts, pins, etc., may also be used.

In order to provide coupling of the coaxial transmission lines via the coaxial connectors 35 to the waveguides 31 and 32, the side-walls 34 of the stacked rectangular waveguides have openings 37 between the circular through-holes 33 and interior regions 36a and 36b of the upper waveguide 31 and the lower rectangular waveguide 32, correspondingly.

The coaxial connectors 35 have no outer conductor shield and a mechanical metal structure of the waveguides serves as the outer conductor for the coaxial connectors. Such provision imitates coaxial transmission lines with the outer conductor shields stripped away from the portions of the coaxial lines which are located against the openings 37 arranged in the side-walls 34 of the waveguides.

The upper rectangular waveguides 31 include a through hole 311 arranged within the top wall 312 in the vicinity of the end 313 of the upper rectangular waveguides 31. The through hole 311 is equipped with a coaxial connector 39 configured for coupling the upper rectangular waveguides 31 to a reference Transmit/Receive (T/R) Module (not shown).

According to the embodiment shown in FIG. 3B, the end 314 of the upper rectangular waveguide 31 and the end 316 of the lower rectangular waveguides 32 are terminated by appropriate loads. Thus, as shown in FIG. 3B, the calibration network system 300 includes a dummy load 315a arranged in the vicinity of the end 314 of the upper rectangular waveguide 31 and a dummy load 315b arranged in the vicinity of the end 316 of the lower rectangular waveguide 32.

According to another embodiment of the present invention, the end 314 of the upper rectangular waveguide 31 can be terminated by another (additional) 90 degree hybrid coupler (not shown) rather than by a dummy load. The additional 90 degree hybrid coupler can be configured to add the possibility of signal injection from two ends of the calibration network, mutatis mutandis. This provision can improve calibration accuracy and stability.

According to an embodiment of the present invention, the calibration network system 300 includes a 90 degree hybrid coupler 38 that combines the functions of the RF power divider/combiner (15 in FIG. 1A) and the 90 degree phase shifter (16 in FIG. 1A) in one device. As shown in FIG. 3B, the 90 degree hybrid coupler 38 includes a pair of openings 380 arranged through the conductive plate 333 between the connector 39 and the connectors 35. The openings 380 are configured to equally divide the signal which is obtained from a reference Transmit/Receive (T/R) Module (not shown) and provided via the connector 39, between the lower rectangular waveguide 32 and the upper rectangular waveguide 31. The openings 380 are also configured to provide the required 90 degree phase shift between signals in the waveguides. When the 90 degree hybrid coupler 38 is connected to the waveguides, it forms a directional coupler to the coaxial connectors 35 so that one port of the 90 degree hybrid coupler 38 is coupled to the antenna elements (not shown) and the other port to the T/R elements (not shown) of the RF front end.

A method of operation of the calibration network system of the present invention is described hereinbelow with reference to FIG. 1A through FIG. 2B.

According to one embodiment of the present invention, the method is implemented for adjusting operation of the RF front end 12 of the array antenna 11. According to this embodiment the method is implemented for calibration in a receiving mode of operation of the RF front end 12.

According to this embodiment, an internal calibration reference signal from the T/R reference module 17 having a known amplitude and phase is injected to the RF power divider/combiner 15 located at the end 173 of the calibration network system 10. The RF power divider/combiner 15 divides the internal calibration reference signal into two equal parts.

A first part of the divided internal calibration signal is coupled into the 90 degree phase shifter (16 in FIG. 1A), whereas a second part of the divided internal calibration signal is coupled into the lower rectangular waveguide (142 in FIG. 1A and 22 in FIG. 2A). The first part of the divided internal calibration signal is passed through the 90 degree phase shifter 16 that provides a minus 90 degree phase shift to the first part of the internal calibration signal.

Then, the first part of the divided internal calibration signal, which was shifted by minus 90 degrees, is transferred within the upper rectangular waveguide (141 in FIG. 1A and 21 in FIG. 2B) and is coupled to the portions of the coaxial transmission lines 13 passing through the side walls (24 in FIGS. 2A and 2B) of the upper rectangular waveguide. The coupling is carried out via the openings (27 in FIG. 2B). The first part of the divided internal calibration signal shifted by minus 90 degrees is transferred from the upper rectangular waveguide towards the lower rectangular waveguide through portions of coaxial transmission lines that have a length of about a quarter of wavelength. As a result, the phase shift of the first part of the divided internal calibration signal is returned to 0 degrees.

In turn, the second part of the divided internal calibration signal is transferred from the RF power divider/combiner 15 towards the coaxial transmission lines 13 within the lower rectangular waveguide (142 in FIG. 1A; 22 in FIG. 2). This second part of the divided internal calibration signal is coupled to the portions of the coaxial transmission lines 13 passing through the lower rectangular waveguide where the second part is combined in phase (i.e., constructive interference) with the first part of the divided internal calibration signal. Then, a combined internal calibration signal including the first and second parts of the divided internal calibration signal received by each coaxial cable is relayed to the RF front ends 12 of the array antenna.

It should be noted that the phase shift between the signals and a quarter wavelength distance between the waveguides causes a signal to combine in phase (constructive interference) when signals are transferred towards RF front end, and to combine in anti-phase (destructive interference) when signals are transferred towards antenna radiating elements. As a result, due to the same amplitude of the coupled signal parts, the energy of the combined calibration signal propagates towards RF front ends direction, while radiating elements of the antenna are isolated and no energy is radiated by the radiating elements.

Further, the combined internal calibration signal relayed to the RF front ends 12 is compared with a corresponding predetermined reference data signal for each T/R Module 120. The predetermined reference data signals are prepared in advance, for example, in the form of a look-up table. This comparison is carried out for all coaxial transmission lines 13 passing through the pair of the vertically stacked waveguides. When the combined internal calibration signal for a certain coaxial transmission line deviates from the corresponding predetermined reference data signal, one or more calibration parameters are calculated. Methods for calculation of the calibration parameters are known in the art per se, and therefore are not expanded upon herein in detail. After calculation, the calibration parameters are applied to the RF front end 12 of the array antenna for adjusting operation of the corresponding T/R modules 120.

According to another embodiment of the present invention, the method is implemented for adjusting operation of the RF front end 12 of the array antenna 11 in a transmitting mode of operation of the RF front end 12. According to this embodiment, an internal calibration signal having a known amplitude and phase is injected sequentially from each T/R module 120 into the corresponding coaxial cable 13.

The major part of the injected internal calibration signal is transferred from the T/R modules 120 of the front end 12 through the coaxial transmission lines 13 towards the antenna elements 110. However, a small part of this signal is coupled into the lower rectangular waveguide (142 in FIG. 1A; 22 in FIG. 2) via the openings 27 from the portions of the coaxial transmission lines passing through the lower rectangular waveguide. Then, this part of the internal calibration signal is transferred within the lower rectangular waveguide, and applied to one output port of the RF power divider/combiner 15.

In turn, the major part of the internal calibration signal is transferred through the portions 131 of coaxial transmission lines 13 from the lower rectangular waveguide (142 in FIG. 1A; 22 in FIG. 2A) towards the upper rectangular waveguide (141 in FIG. 1A; 21 in FIG. 2A). These portions have a length of about a quarter of wavelength. Accordingly they provide a phase shift to the major part of the internal calibration signal of plus 90 degrees.

Then, another small part of the internal calibration signal, which has been transferred between the waveguides through the portions (131 in FIG. 1A; 29 in FIG. 2A) that have a length of about a quarter of wavelength, and therefore has a phase shift of plus 90 degrees, is coupled into the upper rectangular waveguide (141 in FIG. 1A; 21 in FIG. 2A) from the portions of the coaxial transmission lines passing through the upper rectangular waveguide.

This part of the internal calibration signal is transferred within the upper rectangular waveguide and then through the 90 degree phase shifter 16 configured to provide minus 90 degree phase shift. As a result, the relative phase shift between the two small parts of the internal calibration signal is returned to 0 degrees.

Then, the part of the internal calibration signal with the phase shift of 0 degrees is relayed from the phase shifter 16 to the corresponding output port of the RF power divider/combiner 15 connected to the phase shifter 16.

The RF power divider/combiner 15 combines these two small parts of the internal calibration signal which arrived from the lower waveguide and the phase shifter 16, and generates a combined internal calibration signal having 0 degree phase shift.

The combined internal calibration signals originating from the T/R modules 120 are relayed to the reference T/R module 17 for comparing the combined internal calibration signal for each antenna element with corresponding predetermined reference data signals. When the combined internal calibration signal deviates from the corresponding predetermined reference data signals, one or more calibration parameters are calculated. After the calculation, the calibration parameters are applied to the RF front end 12 of the array antenna 11 for adjusting operation of the T/R modules 120.

It should be noted that in this embodiment, most of the signal energy provided by the T/R modules 120 is radiated by the antenna elements. Thus, reflections from external objects in the vicinity of the antenna can occur, and can be received by the antenna elements. However, since the portions (131 in FIG. 1A; 29 in FIG. 1A) of coaxial transmission lines between the upper and lower rectangular waveguides have the length of a quarter wavelength, the relative 90 degree phase shift prevents propagation of the reflected signals received by the antenna elements towards the reference T/R module 17 owing to the destructive interference, thus eliminating influence of the reflections from the external objects on calibration accuracy.

According to a further embodiment of the present invention, the method is implemented for indicating operation of the antenna elements 110 of the array antenna 11. According to this embodiment, an external RF radiation having a known amplitude and phase provided from an external reference RF source is applied into each antenna element for calibration. External calibration signals received by the antenna element are coupled sequentially to the corresponding coaxial transmission lines 13, forming a plurality of receive channels transferring the signals received by the antenna elements towards the T/R modules 13. For each channel, a small part of the external calibration signal is coupled into the upper rectangular waveguide 141 through the portions of the coaxial transmission lines passing through the side-wall of the upper rectangular waveguide, whereas the major part of the external calibration signal is transferred towards the T/R modules 13.

The small part of the external calibration signal that was coupled to the upper rectangular waveguide 141 is transferred through the upper rectangular waveguide 141, and also through the 90 degree phase shifter 16 arranged in the upper rectangular waveguide 141. According to this embodiment, the 90 degree phase shifter 16 is configured to provide a plus 90 degree phase shift to signals transferred therethrough.

Accordingly, the 90 degree phase shifter 16 provides a plus 90 degree shift to the part of the external calibration signal that is transferred within the upper rectangular waveguide. This external calibration signal shifted by plus 90 degree is applied to one output port of the RF power divider/combiner 15 connected to the 90 degree phase shifter 16.

In turn, the major part of the external calibration signal is transferred from the upper rectangular waveguide towards the lower rectangular waveguide through the portions of coaxial transmission lines that have a length of about a quarter of wavelength. Accordingly, the major part of the external calibration signal obtains a phase shift of plus 90 degrees.

Another small part of the external calibration signal is coupled into the lower rectangular waveguide 142 through the portions of the coaxial transmission lines passing through the side-wall of the lower rectangular waveguide. This small part of the external calibration signal is also shifted by plus 90 degrees.

After transferring within the lower rectangular waveguide, this shifted by plus 90 degrees small part of the external calibration signal is applied to another output port of the RF power divider/combiner 15. The RF power divider/combiner 15 combines the two small parts of the external calibration signal to provide a combined external calibration signal having 90 degree phase shift relative to the "primary" external calibration signals that were received by the antenna elements 110.

The combined external calibration signal is relayed to the reference T/R module 17 for comparing the combined external calibration signal for each antenna element with a corresponding predetermined reference data signal.

According to an embodiment of the present invention, an indicating signal can be generated for those coaxial transmission lines for which the combined external calibration signal deviates from the predetermined reference data signal. For this purpose the reference T/R module 17 can include an indicating device (not shown), indicating which particular antenna elements are out of order.

According to still another embodiment of the present invention, the calibration method can be based on the system shown in FIG. 1B. In this case, the calibration signals can be injected from both ends 173 and 174 located at two sides of the waveguides 141 and 142. In the receiving mode of operation of the RF front end 12, the calibration method includes repeating the main steps of the calibration method, described above for the end 173, from the end 174.

More specifically, after the calculation of the calibration parameters based on signal injected from the reference T/R Module 17, the method further includes injecting an internal calibration reference signal (hereinafter referred to as another internal calibration reference signal) from the T/R reference module 170. This another internal calibration reference signal is injected to the RF power divider/combiner 250 located at the end 174 of the calibration network system 10. The RF power divider/combiner 250 divides the internal calibration reference signal into two equal parts.

A first part of the divided another internal calibration signal is coupled into the upper rectangular waveguide (141 in FIG. 1A; 21 in FIG. 2), whereas a second part of the divided another internal calibration signal is coupled into the lower rectangular waveguide (142 in FIG. 1A; 22 in FIG. 2). The first part of the divided another internal calibration signal is transferred through the 90 degree phase shifter 260 that provides a minus 90 degree phase shift to the first part of the internal calibration signal and within the upper rectangular waveguide.

Then, the first part of the divided another internal calibration signal, which was shifted by minus 90 degrees, is coupled to the portions of the coaxial transmission lines 13 passing through the side walls of the upper rectangular waveguide. The coupling is carried out via the openings 27. The first part of the divided another internal calibration signal shifted by minus 90 degrees is transferred from the upper rectangular waveguide towards the lower rectangular waveguide through portions of coaxial transmission lines that have a length of about a quarter of wavelength. As a result, the phase shift of the first part of the divided another internal calibration signal is returned to 0 degrees.

In turn, the second part of the divided another internal calibration signal is transferred from the RF power divider/combiner 250 towards the coaxial transmission lines 13 within the lower rectangular waveguide (142 in FIG. 1A; 22 in FIG. 2). This second part of the divided another internal calibration signal is coupled to the portions of the coaxial transmission lines 13 passing through the lower rectangular waveguide where the second part is combined with the first part of the divided another internal calibration signal. Then, a combined another internal calibration signal including the first and second parts of the divided another internal calibration signal received by each coaxial cable is relayed to the RF front end 12 of the array antenna.

Further, the combined another internal calibration signal is compared with a corresponding predetermined reference data signal for each T/R Module 120. This comparison is carried out for all coaxial transmission lines 13 passing through the pair of vertically stacked waveguides. When the combined internal calibration signal deviates from the corresponding predetermined reference data signal, one or more calibration parameters are calculated.

Then, the calibration parameters obtained for the case when the reference signals were injected from the end 173 and the calibration parameters obtained for the case when the reference signals were injected from the end 174 can be used to calculate average values of these parameters. For example, the arithmetic mean and/or the geometric mean can be calculated.

The average values of the parameters can be then applied to the RF front ends 12 of the array antenna 11 for adjusting operation of the T/R modules 120.

The calibration network system shown in FIG. 1B can also be used for adjusting operation of the T/R modules 120 in the transmitting mode of operation of the RF front end 12, and for indication of operation of the antenna elements 110 of the array antenna 11, mutatis mutandis.

As such, those skilled in the art to which the present invention pertains, can appreciate that while the present invention has been described in terms of preferred embodiments, the concept upon which this disclosure is based may readily be utilized as a basis for the designing of other structures and processes for carrying out the several purposes of the present invention.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A calibration network system for an array antenna having a plurality of antenna elements and a plurality of Transmit/Receive (T/R) modules coupled to the antenna elements through a plurality of corresponding coaxial transmission lines, the calibration network system comprising:

a waveguide arrangement comprising at least one pair of rectangular waveguides having an inside height of side-walls smaller than an inside width of top and bottom walls;

wherein said at least one pair of rectangular waveguides being stacked in a substantially parallel relation to each other to form a lower rectangular waveguide and an upper rectangular waveguide spaced apart from the lower rectangular waveguide at a distance of about a quarter of a desired operating wavelength of the array antenna;

wherein said at least one pair of rectangular waveguides including a plurality of circular through-holes extending through at least one side-wall of the stacked rectangular waveguides from a bottom of the lower rectangular waveguide to a top of the upper rectangular waveguide and having a diameter sufficient to accommodate coaxial transmission lines passing through said circular through-holes;

wherein said at least one side-wall having openings between said circular through-holes and an interior region of said lower and upper rectangular waveguides in order to provide coupling of the coaxial transmission lines into said at least one pair of rectangular waveguides;

at least one 90 degree phase shifter having two phase shifter terminals and coupled at one phase shifter terminal to one end of the upper rectangular waveguide; and at least one RF power divider/combiner having an input port configured for coupling to a reference Transmit/Receive (T/R) Module and two output ports being coupled correspondingly to said at least one 90 degree phase shifter at another phase shifter terminal and to one end of the lower rectangular waveguide.

2. The calibration network system of claim 1, wherein said at least one RF power divider/combiner and said at least one 90 degree phase shifter are combined together in a 90 degree hybrid coupler.

3. The calibration network system of claim 1, wherein the openings in said at least one side-wall are slots along at least a part of the height of the side-walls.

4. The calibration network system of claim 1, wherein each coaxial transmission line includes a wire core, an inner dielectric insulator surrounding the wire core, and a woven wire shield surrounding the inner dielectric insulator, and wherein the outside conductor shield is connected to the bottom wall of the lower rectangular waveguide and to the top wall of the upper rectangular waveguide, whereas the outside conductor shield of the coaxial transmission line is stripped away from the coaxial cable at least from a portion of the coaxial transmission line located against the corresponding slot arranged in said at least one side-wall.

5. The calibration network system of claim 1, wherein said 90 degree phase shifter is configured to provide a minus 90 degree phase shift.

6. The calibration network system of claim 1, wherein said 90 degree phase shifter is configured to provide a plus 90 degree phase shift.

7. The calibration network system of claim 1, wherein other ends of the upper and lower rectangular waveguides, which are not coupled to said least one RF power divider/combiner, are terminated with a dummy load.

8. The calibration network system of claim 1, wherein said coaxial transmission lines include coaxial cables.

9. The calibration network system of claim 1, further comprising:
  another 90 degree phase shifter having two phase shifter terminals and connected at one phase shifter terminal to another end of the upper waveguide; and
  another RF power divider/combiner having an input port configured for coupling to another reference Transmit/Receive (T/R) Module and two output ports being connected correspondingly to said another 90 degree phase shifter at another phase shifter terminal and to another end of the lower waveguide.

10. The calibration network system of claim 9, wherein said another RF power divider/combiner and said another 90 degree phase shifter are combined together in another 90 degree hybrid coupler.

11. The calibration network system of claim 1, wherein each waveguide in said at least one pair of rectangular waveguides is a rectangular ridge waveguide.

12. The calibration network system of claim 1, wherein at least one waveguide in said at least one pair of rectangular waveguides is filled with a dielectric material.

13. A method of calibrating an array antenna having a plurality of antenna elements connected to a plurality of T/R modules of an RF front end of the array antenna through a plurality of corresponding coaxial transmission lines in a receiving mode of operation of the RF front end, the method comprising:
  providing a calibration network system including:
    a waveguide arrangement comprising at least one pair of rectangular waveguides having an inside height of side-walls smaller than an inside width of top and bottom walls; said at least one pair of rectangular waveguides being stacked in a substantially parallel relation to each other to form a lower rectangular waveguide and an upper rectangular waveguide spaced apart from the lower rectangular waveguide at a distance of about a quarter of a desired operating wavelength of the array antenna; said at least one pair of rectangular waveguides including a plurality of circular through-holes extending through at least one side-wall of the stacked rectangular waveguides from a bottom of the lower rectangular waveguide to a top of the upper rectangular waveguide and having a diameter sufficient to accommodate coaxial transmission lines passing through said circular through-holes; said at least one side-wall having openings between said circular through-holes and an interior region of said lower and upper rectangular waveguides in order to provide coupling of the coaxial transmission lines into said at least one pair of rectangular waveguides;
    at least one 90 degree phase shifter having two phase shifter terminals and coupled at one phase shifter terminal to one end of the upper rectangular waveguide; and
    at least one RF power divider/combiner having an input port configured for coupling to a reference Transmit/Receive (T/R) Module and two output ports being coupled correspondingly to said at least one 90 degree phase shifter at another phase shifter terminal and to one end of the lower rectangular waveguide;
  injecting from a T/R reference module an internal calibration signal having a known amplitude and phase to the input port of said at least one RF power divider/combiner of the calibration network system to obtain a first part of the divided internal calibration signal and a second part of the divided internal calibration signal,
  coupling the first part of the divided internal calibration signal into said at least one 90 degree phase shifter, and coupling a second part of the divided internal calibration signal into the lower rectangular waveguide;
  transferring the first part of the divided internal calibration signal through said at least one 90 degree phase shifter to provide a minus 90 degree phase shift thereto;
  transferring the first part of the divided internal calibration signal shifted by minus 90 degrees through the upper rectangular waveguide and coupling it to portions of the coaxial transmission lines passing through the upper rectangular waveguide;
  transferring the first part of the divided internal calibration signal shifted by minus 90 degrees through portions of coaxial transmission lines that have a length of about a quarter of wavelength from the upper rectangular waveguide towards the lower rectangular waveguide, thereby to return the phase shift of the first part of the divided internal calibration signal to 0 degrees;
  transferring the second part of the divided internal calibration signal within the lower rectangular waveguide,
  coupling the second part of the divided internal calibration signal to the portions of the coaxial transmission lines passing through the lower rectangular waveguide to combine in this portion of the coaxial lines the second part of the divided internal calibration signal with the first part of the divided internal calibration signal;
  relaying a combined internal calibration signal including the first and second parts of the divided internal calibration signal received by each coaxial transmission line to the RF front end of the array antenna;
  comparing the combined internal calibration signal for each coaxial transmission line with a corresponding predetermined reference data signal; and
  calculating at least one calibration parameter when the combined internal calibration signal deviates from the corresponding predetermined reference data signal.

14. The method of claim 13, further comprising applying said at least one calibration parameter to the RF front end of the array antenna for adjusting operation of the T/R modules.

15. The method of claim 13, further comprising:
  providing another 90 degree phase shifter having two phase shifter terminals and connected at one phase shifter terminal to another end of the upper waveguide;
  providing another RF power divider/combiner having an input port configured for coupling to another reference Transmit/Receive (T/R) Module and two output ports being connected correspondingly to said another 90 degree phase shifter at another phase shifter terminal and to another end of the lower waveguide;
  injecting from another T/R reference module another internal calibration signal having a known amplitude and phase to the input port of said another RF power divider/combiner of the calibration network system to obtain a first part of the divided another internal calibration signal and a second part of the divided another internal calibration signal, coupling the first part of said divided another internal calibration signal into said another 90 degree phase shifter and coupling the second part of the divided another internal calibration signal into the lower rectangular waveguide;

transferring the first part of the divided another internal calibration signal through said another 90 degree phase shifter to provide minus 90 degree phase shift thereto;

transferring the first part of the divided another internal calibration signal shifted by minus 90 degrees through the upper rectangular waveguide and coupling it to portions of the coaxial transmission lines passing through the upper rectangular waveguide;

transferring the first part of the divided another internal calibration signal shifted by minus 90 degrees through portions of coaxial transmission lines that have a length of about a quarter of wavelength from the upper rectangular waveguide towards the lower rectangular waveguide, thereby to return the phase shift of the first part of the divided another internal calibration signal to 0 degrees;

transferring the second part of the divided another internal calibration signal within the lower rectangular waveguide, coupling the second part of the divided another internal calibration signal to the portions of the coaxial transmission lines passing through the lower rectangular waveguide to combine in this portion of the coaxial lines the second part of the divided another internal calibration signal with the first part of the divided another internal calibration signal;

relaying a combined another internal calibration signal including the first and second parts of the divided internal calibration signal received by each coaxial transmission line to the RF front end of the array antenna;

comparing the combined another internal calibration signal for each coaxial transmission line with a corresponding predetermined reference data signal and;

calculating at least one calibration parameter when the combined another internal calibration signal deviates from the corresponding predetermined reference data signal;

calculating an average value of said at least one calibration parameter on the basis of the data obtained from both ends of said at least one pair of rectangular waveguides; and applying said average value of said at least one calibration parameter to the RF front end of the array antenna for adjusting operation of the T/R modules.

16. A method of calibrating an array antenna having a plurality of antenna elements coupled to a plurality of T/R modules of the array antenna through a plurality of corresponding coaxial transmission lines in a transmitting mode of operation of the RF front end, the method comprising:

providing a calibration network system including:
a waveguide arrangement comprising at least one pair of rectangular waveguides having an inside height of side-walls smaller than an inside width of top and bottom walls; said at least one pair of rectangular waveguides being stacked in a substantially parallel relation to each other to form a lower rectangular waveguide and an upper rectangular waveguide spaced apart from the lower rectangular waveguide at a distance of about a quarter of a desired operating wavelength of the array antenna; said at least one pair of rectangular waveguides including a plurality of circular through-holes extending through at least one side-wall of the stacked rectangular waveguides from a bottom of the lower rectangular waveguide to a top of the upper rectangular waveguide and having a diameter sufficient to accommodate coaxial transmission lines passing through said circular through-holes; said at least one side-wall having openings between said circular through-holes and an interior region of said lower and upper rectangular waveguides in order to provide coupling of the coaxial transmission lines into said at least one pair of rectangular waveguides;

at least one 90 degree phase shifter having two phase shifter terminals and coupled at one phase shifter terminal to one end of the upper rectangular waveguide; and at least one RF power divider/combiner having an input port configured for coupling to a reference Transmit/Receive (T/R) Module and two output ports being coupled correspondingly to said at least one 90 degree phase shifter at another phase shifter terminal and to one end of the lower rectangular waveguide;

injecting from each T/R module an internal calibration signal having a known amplitude and phase into corresponding coaxial transmission line;

coupling a small part of the internal calibration signal into the lower rectangular waveguide through the portions of the coaxial transmission lines passing through the lower rectangular waveguide, transferring this part of the internal calibration signal within the lower rectangular waveguide, and applying this part of the internal calibration signal to one output port of said at least one RF power divider/combiner;

transferring a major part of the internal calibration signal through portions of coaxial transmission lines that have a length of about a quarter of wavelength from the lower rectangular waveguide towards the upper rectangular waveguide, thereby to provide a phase shift to the major part of the internal calibration signal of plus 90 degrees;

coupling another small part of the internal calibration signal having a phase shift of plus 90 degrees into the upper rectangular waveguide from the portions of the coaxial transmission lines passing through the upper rectangular waveguide;

transferring said another small part of the internal calibration signal within the upper rectangular waveguide and through said at least one 90 degree phase shifter configured to provide minus 90 degree phase shift thereto, thereby to return the phase shift of said another part of the internal calibration signal to 0 degrees;

applying said another small part of the internal calibration signal with a phase shift of 0 degrees to another output port of said at least one RF power divider/combiner;

combining two small parts of the internal calibration signal by the RF power divider/combiner to obtain a combined internal calibration signal having 0 degree phase shift;

relaying said combined internal calibration signal to a reference T/R module;

comparing the combined internal calibration signal for each antenna element with a corresponding predetermined reference data signal;

calculating at least one calibration parameter when the combined internal calibration signal deviates from the corresponding predetermined reference data signal; and applying said at least one calibration parameter to RF front end of the array antenna for adjusting operation of the T/R modules.

17. A method of calibrating an array antenna having a plurality of antenna elements connected to a plurality of T/R modules of the array antenna through a plurality of the corresponding coaxial transmission lines for indicating operation of the antenna elements, the method comprising:

providing a calibration network system including:
a waveguide arrangement comprising at least one pair of rectangular waveguides having an inside height of side-walls smaller than an inside width of top and bottom walls; said at least one pair of rectangular waveguides being stacked in a substantially parallel relation to each other to form a lower rectangular waveguide and an upper rectangular waveguide spaced apart from the lower rectangular waveguide at a distance of about a quarter of a desired operating wavelength of the array antenna; said at least one pair of rectangular waveguides including a plurality of circular through-holes extending through at least one side-wall of the stacked rectangular waveguides from a bottom of the lower rectangular waveguide to a top of the upper rectangular waveguide and having a diameter sufficient to accommodate coaxial transmission lines passing through said circular through-holes; said at least one side-wall having openings between said circular through-holes and an interior region of said lower and upper rectangular waveguides in order to provide coupling of the coaxial transmission lines into said at least one pair of rectangular waveguides;

at least one 90 degree phase shifter having two phase shifter terminals and coupled at one phase shifter terminal to one end of the upper rectangular waveguide; and at least one RF power divider/combiner having an input port configured for coupling to a reference Transmit/Receive (T/R) Module and two output ports being coupled correspondingly to said at least one 90 degree phase shifter at another phase shifter terminal and to one end of the lower rectangular waveguide;

applying an external calibration RF radiation having a known amplitude and phase from an external reference RF source sequentially to each of said plurality of antenna elements and coupling an external calibration signal generated by the antenna elements to coaxial transmission lines;

coupling a small part of the external calibration signal into the upper rectangular waveguide through the portions of the coaxial transmission lines passing through the side-wall of the upper rectangular waveguide;

transferring said small part of the external calibration signal within the upper rectangular waveguide and through said at least one 90 degree phase shifter to provide plus 90 degree phase shift thereto, and applying the part of the external calibration signal shifted by plus 90 degrees to one output port of said at least one RF power divider/combiner;

transferring a major part of the external calibration signal from the upper rectangular waveguide towards the lower rectangular waveguide through portions of coaxial transmission lines that have a length of about a quarter of wavelength, thereby to provide a phase shift to the external calibration signal of plus 90 degrees;

coupling another small part of the external calibration signal shifted by plus 90 degrees to the lower rectangular waveguide for transferring therethrough towards said at least one RF power divider/combiner;

applying said another small part of the external calibration signal transferred through the lower rectangular waveguide to another output port of said at least one RF power divider/combiner;

combining the two small parts of the external calibration signal by the RF power divider/combiner to obtain a combined external calibration signal having 90 degree phase shift;

relaying said combined external calibration signal to a reference T/R module;

comparing the combined external calibration signal for each antenna element with a predetermined reference data signal; and providing an indication of those coaxial transmission lines for which the combined external calibration signal deviates from the corresponding predetermined reference data signal.

* * * * *